P. HABECK.
THRESHING MACHINE.
APPLICATION FILED SEPT. 29, 1916.
1,263,233.
Patented Apr. 16, 1918.
2 SHEETS—SHEET 2.
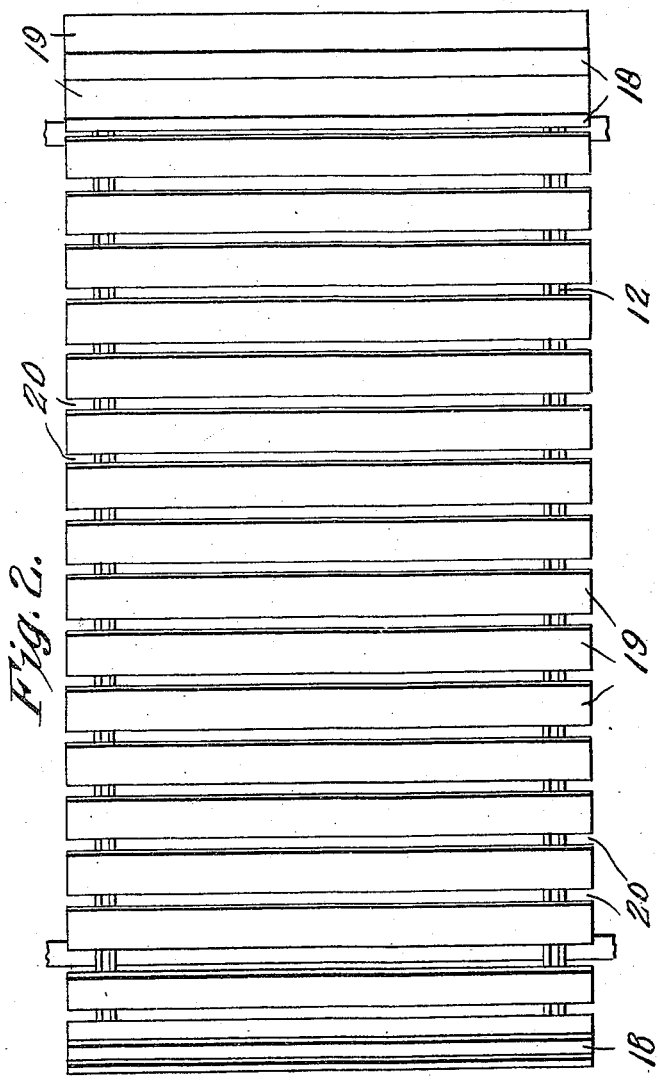
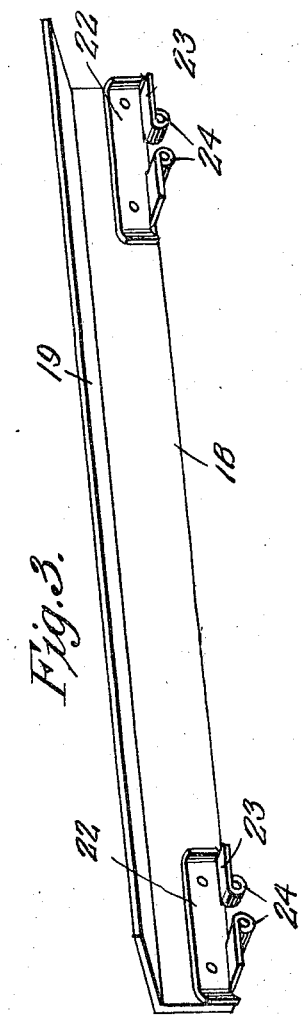
WITNESSES
James F. Crown,
Wm Zeaman
INVENTOR
Paul Habeck,
BY Richard Owen.
ATTORNEY

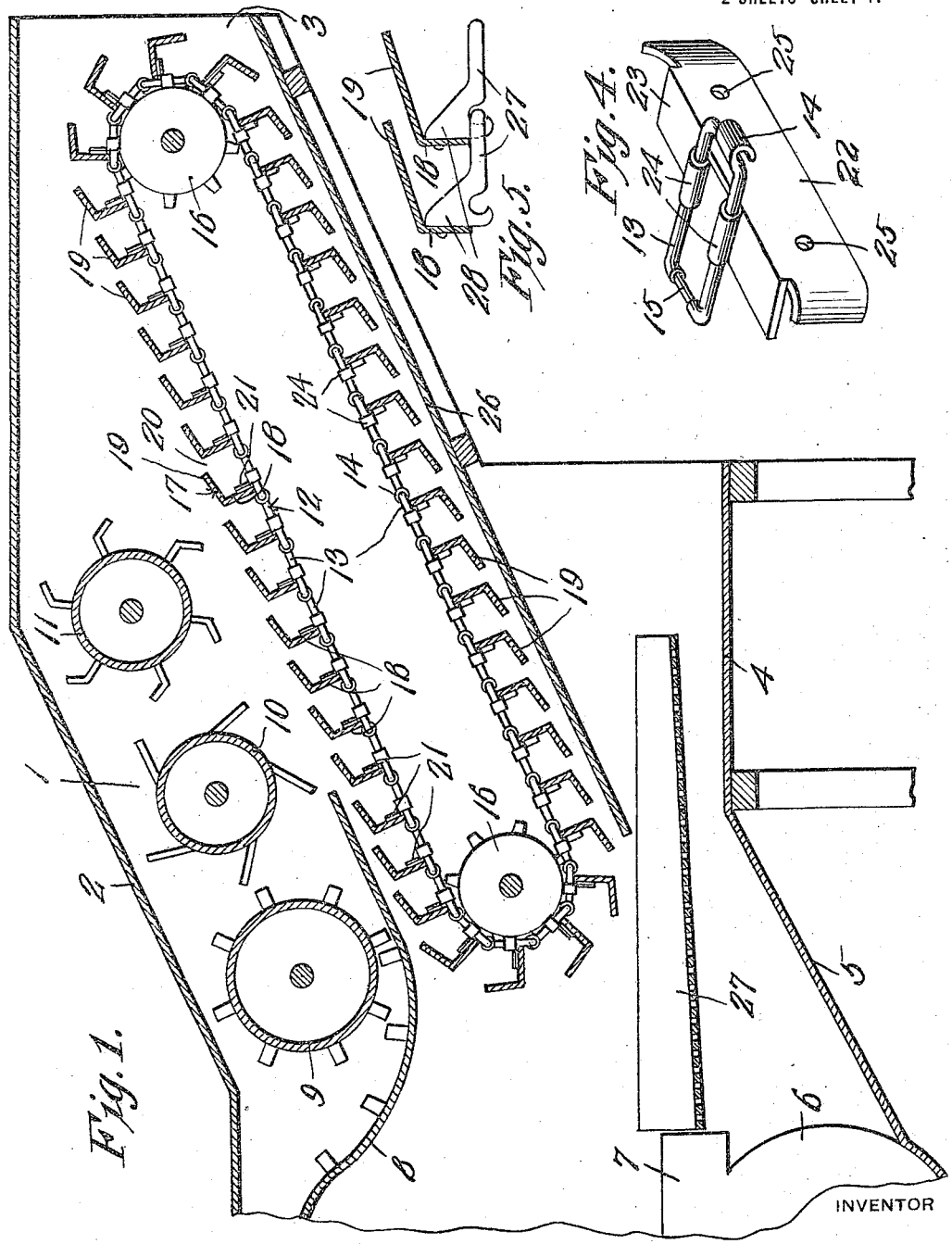

UNITED STATES PATENT OFFICE.

PAUL HABECK, OF CHEYENNE, OKLAHOMA.

THRESHING-MACHINE.

1,263,233. Specification of Letters Patent. Patented Apr. 16, 1918.

Application filed September 29, 1916. Serial No. 122,904.

*To all whom it may concern:*

Be it known that I, PAUL HABECK, a citizen of the United States, residing at Cheyenne, in the county of Roger Mills and State of Oklahoma, have invented certain new and useful Improvements in Threshing-Machines, of which the following is a specification.

This invention has relation to agricultural machines with special reference to threshers, and the nature and objects thereof will be readily apparent to those skilled in the art to which it appertains in the light of the following explanation of the accompanying drawings, illustrating what I now believe to be the preferred embodiment, or mechanical expression, of my invention from among other forms and arrangements within the spirit of the invention, or the scope of the appended claim.

However, an object of the invention is to provide an improvement in a threshing machine which improvement consists in substituting an element, conjunctively utilizable as a straw carrier and grain separator in lieu of the element employed for the performance of similar functions and which are provided as separate elements in threshing machines of the type heretofore constructed.

Another object of the invention is to improve the threshing machine by providing a single element having the above named characteristics and wherein the processes of separating the grain from the straw, and conveying the separated elements in opposite directions in accordance with the method at present employed in conventional threshing machines, with an increase in the proportion of grain saved.

In addition to the foregoing my invention comprehends improvements in the details of construction and arrangement of parts to be hereinafter more fully described and particularly set forth in the appended claim.

In the accompanying drawings in which similar and corresponding parts are designated by the same characters of reference throughout the several views in which they appear;

Figure 1, is a view in vertical longitudinal section of a threshing machine embodying my improvement.

Fig. 2, is a view in plan of the combined straw carrier and grain separator.

Fig. 3, is a view in perspective of one of the flaps of the combined straw carrier and grain separator, and Fig. 4, is a detail view in perspective of one of the clips for attaching the slats to the conveyer chain.

Fig. 5, is a detail view of another method of supporting the slats upon the chain.

With reference to the drawings, 1 and 2 indicate respectively the side and roof plate of a grain threshing machine, which, after the conventional manner are extended toward the right as indicated at 3 to form the hay stacker through which the threshed straw is directed toward the hay stack. The bottom of the frame work of the machine is indicated at 4, and is formed with a downwardly and rearwardly directed portion 5 at the rear end of which is located a blower indicated conventionally at 6 with its air outlet 7 directed toward the hay stacker 3.

Adjacent the upper portion of the machine, there is provided the usual concave 8 adapted for coaction with a cylinder 9, and a pair of feeders 10 and 11 are located to the right of the concave 9 with the axes of the feeders and the cylinder disposed in substantially the same inclined plane.

The sheaves of wheat to be threshed are fed in between the cylinder and the concave after the usual manner, and the threshed straw with the grain clinging thereto is carried rearwardly by means of the beaters 10 and 11, and is permitted to fall upon the upper stretch of a combined straw carrier and grain separator which forms the essential feature of the present invention. The combined straw carrier and grain separator comprises a pair of transversely spaced endless chains 12 each comprising links 13 of the inclosed loop type having one end provided with a hook portion 14, and the opposite end with a reduced portion 15 to receive the hook portion of the next succeeding link. Sprockets 16 are located in longitudinal spaced relation at a point adjacent the end of the stacker 3, and interiorly of the machine at a point beneath the concave 8, the stacker being disposed at relative vertical elevation so as to dispose the upper stretches of the chain 12 at an incline, the stacker at the hay stack end being uppermost.

The chains 12 are connected by means of slats 17. Each slat is formed of a strip of metal creased in a longitudinal direction so as to form an attaching portion 18 disposable in a plane perpendicular to the plane of the chain stretchers, and a substantially right-angular portion 19, the portions 19 being however inclined downwardly and rearwardly as indicated to advantage in Fig. 1. The longitudinal edges of the portions 19 of the slats are slightly separated to form transversely extending reduced openings 20. The attaching portions 18 of the slats are connected to the same through the medium of attaching clips 21 which are in the form of strips of metal, bent longitudinally to form portions 22 and 23 at right-angular cross sectional relation, the intermediate portion of the member 23 being divided transversely to form lugs 24, which are bent around the longitudinal members of an adjacent link as indicated in Fig. 4. The portion 22 of the attaching clips 21 are secured to the attaching portions 18 of the slats by means of rivets or the like, which enter apertures 25 in the clips.

It will be noted upon reference to Fig. 1, that in the upper stretch of the combined straw carrier and grain separator, the portions 19 of each of the slats are inclined in a plane which is directed downwardly and rearwardly, and owing to this degree of inclination thus provided, at the lower stretch of said combined straw carrier and grain separator, the portions 19 are likewise inclined rearwardly and downwardly to the same degree. The aspect of the upper stretch of the combined straw carrier and grain separator is illustrated in Fig. 2, and it will be obvious that the wheat falling upon the said surface of the slats is subjected to a separating process owing to the vibration of the combined straw carrier and grain separator induced by the normal operation of the threshing machine. As the threshed wheat falls upon the upper surface of the grain separator and straw carrier, motion is imparted to one of the sprockets 16 by means (not shown) and the upper stretch of the conveyer moved in an upward direction toward the straw stacker 3. Owing to the vibration of the combined grain separator and straw carrier, the grain falls through the spaces 20 between the slats, upon the under side of the slats of the lower stretch, and thence through the openings therebetween upon a grain table 26 which extends beneath the lower stretch thereof. The lower end of the grain table is adapted to empty the grain upon a riddle 27 from which the chaff is cleaned by means of the blower 6. The straw from which the grain has been removed, is then carried rearward and upward toward the hay stacker 3 from which it is ejected after the usual manner of a straw carrier. Attention is called to the fact that the outlet of the blower 6 is positioned so as to create a draft of air through the frame of the threshing machine, over and under the riddle 27 and also above the grain table 26 through the spaces between the slats 17 thereby removing respectively the chaff, and assisting the conveyance of the threshed straw toward the hay stack.

Thus it will be seen, that owing to the provision of the combined straw carrier and grain remover, the shakers and a separate conveyer as now embodied in the conventional threshing machine is obviated, and a single element substituted therefor. The construction of the machine having been thus simplified, its manufacture at a reduced cost is assured. Other advantages will be apparent to those familiar with the art to which this machine appertains.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention or the scope of the appended claim.

Having thus described my invention, what I claim as new and desire to secure by Letters Patent is:—

An endless conveyer including a pair of spaced endless chains, a clip mounted on each link of the chain including an attaching portion disposed in a plane at right-angles to the plane of the chain, a pair of lugs extending laterally from one edge of the attaching portion in the same direction having their adjacent ends bent and rolled to embrace the sides of the links, and a plurality of slats supporting their ends upon opposed clips of the chain including a portion for attachment to the attaching portion of the clip to lie in substantially the same plane.

In testimony whereof I affix my signature in presence of two witnesses.

PAUL HABECK.

Witnesses:
J. W. MILLER,
R. C. BROWN.